United States Patent [19]

Pohlemann et al.

[11] 4,083,835

[45] Apr. 11, 1978

[54] COATING PROCESSES, COMPOSITIONS AND SUBSTRATES COATED WITH MALEIC ANHYDRIDE COPOLYMERS HAVING THE ANHYDRIDE MOIETIES REACTED WITH HYDROZINE OR ITS DERIVATIVES

[75] Inventors: Heinz Pohlemann, Limburgerhof; Hermann Gausepohl, Mutterstadt; Herbert Naarmann, Wattenheim, all of Germany

[73] Assignee: BASF Aktiengesellschaft, Ludwigshafen am Rhein, Germany

[21] Appl. No.: 699,931

[22] Filed: Jun. 25, 1976

[30] Foreign Application Priority Data

Aug. 2, 1975 Germany ............................ 2534613

[51] Int. Cl.² .......................... C08F 8/30; C08F 8/34

[52] U.S. Cl. ....................... 260/79.5 C; 260/29.6 TA; 260/79.3 M; 428/334; 428/463; 428/507; 428/522; 526/6; 526/15; 526/30; 526/51; 526/89; 526/217; 526/272

[58] Field of Search ........................... 526/15, 30, 51; 260/79.5 C, 79.3 M

[56] References Cited

U.S. PATENT DOCUMENTS

| | | | |
|---|---|---|---|
| 2,456,177 | 12/1948 | Cupery | 260/78 |
| 2,914,510 | 11/1959 | Contols | 260/78 |
| 3,157,595 | 11/1964 | Johnson et al. | 210/54 |

*Primary Examiner*—Stanford M. Levin
*Attorney, Agent, or Firm*—Keil, Thompson & Shurtleff

[57] ABSTRACT

Copolymers which have a molecular weight of from 600 to 24,500, and which contain from 0.1 to 60 per cent by weight of succinic acid hydrazide units and from 99.9 to 40% by weight of one or more ethylenically unsaturated monomers which are copolymerizable with maleic anhydride, are used as coating agents and binders.

8 Claims, No Drawings

COATING PROCESSES, COMPOSITIONS AND SUBSTRATES COATED WITH MALEIC ANHYDRIDE COPOLYMERS HAVING THE ANHYDRIDE MOIETIES REACTED WITH HYDROZINE OR ITS DERIVATIVES

This invention relates to maleic anhydride copolymers containing succinic acid hydrazide units.

U.S. Pat. No. 3,157,595 discloses the reaction of maleic anhydride copolymers, which are manufactured by free radical copolymerization of maleic anhydride with ethylenically unsaturated compounds in the presence of solvents, with disubstituted N,N-diamines to give the corresponding half-amides. This reaction is carried out in an organic medium which does not dissolve the copolymer. High molecular weight products, which are used as flocculants, are obtained.

It is an object of the present invention to provide copolymers which can be employed for a variety of purposes.

We have found that this object is achieved by providing copolymers which have a molecular weight of from 600 to 24,500 and which contain units of the formula

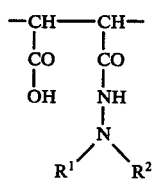 (I)

where $R^1$ and $R^2$ are identical or different and are —H, —CH$_3$, —C$_2$H$_5$, —C$_3$H$_7$,

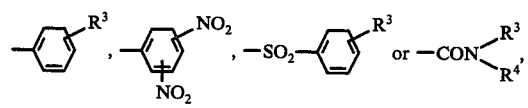

and $R^3$ and $R^4$ are —H, —CH$_3$, —C$_2$H$_5$ or —C$_3$H$_7$ ($R^3$ and $R^4$ being identical or different).

The copolymers may be manufactured by reacting copolymers containing maleic anhydride units and having a molcular weight below 24,500 with compounds of the formula

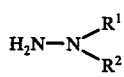 (II)

where $R^1$ and $R^2$ are —H, —CH$_3$, —C$_2$H$_5$, —C$_3$H$_7$,

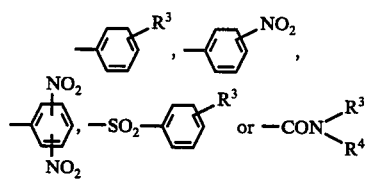

and $R^3$ and $R^4$ are —H, —CH$_3$, —C$_2$H$_5$ or —C$_3$H$_7$. Copolymers which have a molecular weight of from 1,000 to 5,000 exhibit particularly advantageous technological properties. These copolymers are obtained by continuously copolymerizing maleic anhydride, at from 130° to 320° C, with one or more ethylenically unsaturated compounds which are copolymerizable with maleic anhydride. The copolymerization is preferably carried out in the absence of an added chemical initiator. The copolymer melt obtained is reacted directly with the compounds of the formula II to give copolymers containing succinic acid hydrazide units.

Suitable ethylenically unsaturated compounds which are copolymerizable with maleic anhydride are, for example, α-olefins, preferably of 2 to 12 carbon atoms, eg. ethylene, propylene, n- and iso-butene, 4-methylpentene-1, hexene, cyclohexene, octene-1, decene-1 and dodecene-1, as well as monovinyl-aromatic compounds such as styrene, methylstyrene or more highly substituted styrenes. The maleic anhydride copolymers may contain one or more of the said α-olefins as copolymerized units. Examples of other compounds copolymerizable with maleic anhydride are alkyl esters of ethylenically unsaturated carboxylic acids of 3 to 5 carbon atoms, alkyl esters and alkyl half-esters of maleic acid and fumaric acid, acrylamide, methacrylamide, acrylonitrile, methacrylonitrile, acrylic acid, methacrylic acid, crotonic acid, itaconic acid, α-methyleneglutaric acid, vinylphosphonic acid, acrylamidopropanesulfonic acid, vinyl-lactic acid and alkyl vinyl ethers, eg. vinyl methyl ether, vinyl ethyl ether, vinyl n-propyl ether and/or vinyl isopropyl ether, vinyl n-butyl ether, vinyl secondary-butyl ether and vinyl tertiary-butyl ether. The maleic anhydride copolymers may contain one or more of the said comonomers as copolymerized units and may be, eg., copolymers of maleic anhydride and vinyl n-butyl ether which may contain acrylic acid or methacrylic acid as copolymerized units, copolymers of maleic anhydride, styrene and methyl acrylate, and copolymers of maleic anhydride, acrylonitrile and vinylphosphonic acid.

Further suitable acrylic esters and methacrylic esters are those obtained by esterifying acrylic acid or methacrylic acid with polyhydric alcohols or with aminoalcohols. These monomers have the general formula

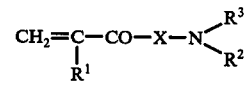

where $R^1$ is H or CH$_3$, $R^2$ and $R^3$ are alkyl of 1 to 4 carbon atoms, —CH$_2$—OH or —CH$_2$—CH$_2$—OH, X is —O—CH$_2$—CH$_2$—, —O—CH$_2$—CH$_2$—CH$_2$—,

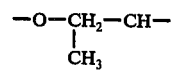

or —NH—(CH$_2$)$_n$—CH$_2$ and $n$ is from 1 to 3.

The maleic anhydride copolymers may be manufactured by conventional processes. Maleic anhydride may be copolymerized with one or more of the compounds in question in the presence of a solvent and of a polymerization initiator and, if appropriate, of a polymerization regulator, at from 80° to 160° l C. Examples of suitable compounds which form free radicals are azo compounds, organic peroxides, eg. benzoyl peroxide and lauroyl peroxide, or hydroperoxides, eg. tert.-butyl hydroperoxide, and inorganic compounds, eg. potassium peroxydisulfate.

Preferably, the copolymers according to the invention which contain succinic acid hydrazide units are manufactured from maleic anhydride copolymers having a molecular weight of from 600 to 5,000. These copolymers are obtained when maleic anhydride, together with one or more ethylenically unsaturated monomers, is copolymerized continuously at from 130° to 320° C. The copolymerization is carried out in the absence of polymerization regulators and preferably also in the absence of polymerization initiators. The pressures at which the polymerization is carried out are in general above 1 bar and preferably from 3 to 50 bars. However, polymerization can also be carried out at pressures of up to 1,000 bars or even above, but in that case appropriately designed apparatus is required.

Preferably, the monomers are polymerized thermally at from 170° to 250° C. The conventional compounds which form free radicals may be used in the polymerization reaction. Oligomers of p- or m-diisopropylbenzene or other compounds whereof the C—C bond can easily undergo thermal scission may also be used as compounds which form free radicals. Examples of such compounds are 1,2-diphenyl-1,1',2,2'-tetramethylethane, 1,2-diphenyl-1,1',2,2'-tetramethylcarboxyethane, 1,2-diphenyl-1,2-dimethylcarboxy-1',2'-dicyanoethane and

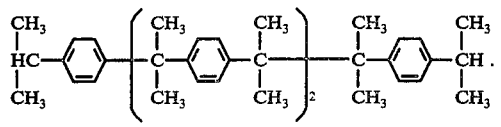

From 0.1 to 3% by weight, preferably from 0.2 to 2.0% by weight, based on the monomers, of the said compounds which form free radicals are suitably used. As compared to the conventional polymerization processes, the process according to the invention requires substantially lower amounts — if any — of compounds which form free radicals, in order to manufacture polymers of relatively low molecular weight.

The polymerization apparatus used may be, eg., a pressure kettle cascade, a pressure tube or a pressure kettle followed by a reaction tube equipped with a static mixer. Preferably, the monomers are polymerized in at least two polymerization zones connected in series. In that case, one reaction zone can consist of a pressure-resistant kettle and the other of a pressure-resistant reaction tube, preferably a static mixer which can be heated. If the polymerization is carried out in two successive zones, conversions in excess of 98% are achieved. During the polymerization, good mixing of the components must be ensured; for example, pressure-resistant kettles equipped with a stirrer, or polymerization tubes equipped with a static mixer, are employed.

The copolymerization is suitably carried out continuously. For example, copolymers of styrene and maleic anhydride are obtained by feeding the monomers continuously to a reactor or to two successive polymerization zones, eg. a pressure kettle cascade, and discharging the mixture continuously from the reaction zone after a residence time of from 3 to 60 minutes, preferably from 5 to 30 minutes, at from 130° to 320° C.

Continuous polymerization, for the purposes of the present invention, also includes a method in which first about 10% of the monomer mixture are introduced into a polymerization zone, eg. a kettle, and the remainder of the monomer mixture is then run in continuously in the course of from 30 to 300 minutes. However, with this variant of the process, the space-time yields are not as high as in the case of continuous polymerization in two successive reaction zones.

In contrast to the conventional processes, the polymerization is preferably carried out in the absence of a solvent or diluent. However, solvents which do not act as regulators, eg. dioxane, toluene, dimethylformamide, tetrahydrofuran, benzene or xylene, may be present.

In the preferred embodiment of the process, a solvent-free polymer melt is obtained. As a rule, the unconverted monomers are removed, eg. by introducing the melt into a zone of reduced pressure, and the copolymer melt is then reacted with the compounds of the formula II. The reaction temperatures may vary within a wide temperature range, and may be, eg., from −10° to about 300° C. Where necessary, the reaction can also be carried out under pressure. Preferably, the polymer melt is reacted with the compounds of the formula II, but an alternative procedure is to disperse the polymer in a diluent, eg. dioxane, dimethylformamide, N-methylpyrrolidone and tetramethylurea, and then to add one or more compounds of the formula II. Examples of suitable compounds of the formula II are hydrazine, methylhydrazine, N,N-dimethylhydrazine, ethylhydrazine, N,N-diethylhydrazine, propylhydrazine, N,N-dipropylhydrazine, semicarbazide, 2,4-dinitrophenylhydrazine, nitrophenylhydrazine, benzenesulfonic acid hydrazide and toluenesulfonic acid hydrazide.

The molar ratio of maleic anhydride units in the copolymer to compounds of the formula II is from 0.1:1 to 10:1. Preferably, the components are reacted in a molar ratio of 1:1. Copolymers containing succinic acid hydrazide units are obtained, which are in equilibrium with the corresponding betaine units. The carboxyl groups of the copolymers according to the invention can be neutralized completely or partially. Examples of suitable bases for neutralizing the copolymers are alkali metal hydroxide such as sodium hydroxide or potassium hydroxide, ammonia and amines.

The copolymers according to the invention contain from 0.1 to 60% by weight, and preferably from 15 to 40% by weight, of succinic acid hydrazide units. The copolymers are used, for example, as sizing agents for paper, as coating agents for various substrates such as wood, metal, concrete and leather, as binders for paper coating compositions, as binders for baking enamels and print pastes, as coating agents for textile materials and as binders for nonwovens. As a rule, the coated or impregnated substrates are heated at above 110° C. Under these conditions, the hydrazide groups of the copolymer undergo scission to give isocyanate groups which react, eg., with the OH groups of cellulose. However, the isocyanate groups can also react in other ways and bring about a crosslinking of the polymer.

Alkali metal salts or ammonium salts of the copolymers of the invention are above all suitable for use in tub sizing and engine sizing of paper. Preferably, they are used as tub sizes by applying an aqueous solution of the salts of the copolymer to a prefabricated paper web, in amounts of from 0.05 to 5% by weight, preferably from 0.1 to 2% by weight, of copolymer, based on dry fibers.

Papers with excellent sizing effects are obtained. The advantage over conventional paper sizes is above all that variations in the degree of acidity of the paper, which may be due to variations in quality of the fresh water or of the back-water used in the manufacture of the paper, do not lead to variations in the sizing degree. The sizing effect is thus substantially independent of the pH of the pulp water. The sizing agents manufactured according to the invention are rapidly absorbed on the fibers and permit the use of high machine speeds. In addition, the copolymers may be used as water-soluble surface-coatings, sedimentation assistants and emulsifiers.

The Examples which follow illustrate the invention in more detail. In the Examples, parts and percentages are by weight. The molecular weights given in the description and in the Examples were determined by vapor pressure osmometry in chloroform at a concentration of 0.1% by weight and at 37° C, using a Mechrolab osmometer. The sizing action of the copolymers containing succinic acid hydrazide units was determined by measuring the sizing degree by the Cobb test (one minute) and the time in minutes, for 50% strike-through, in the ink flotation test, using DIN 53,126 test ink.

EXAMPLE 1

A copolymer of 60 parts of styrene, 10 parts of n-butyl acrylate and 30 parts of maleic anhydride (manufactured by solution polymerization of the monomers in 65% strength solution in dimethylformamide, using 2 parts of azodiisobutyronitrile, in the course of 5 hours at 85° C, the copolymer having a molecular weight of 9,300) was reacted with 18.5 parts of N,N'-dimethylhydrazine in dimethylformamide at 80° C to give a copolymer containing succinic acid hydrazide units. The reaction time was 3 hours.

The copolymer containing succinic acid hydrazide units was used as an 0.1% strength aqueous solution for the tub sizing of paper. Two different papers were sized:

Test paper A: Wood-free offset, 14% ash (clay), 1% alum; manufactured at a pulp water pH of 6.8; 80 g/m².

Test paper B: Wood-free offset, 14% ash (clay), 4% alum; manufactured at a pulp water pH of 4.6; 80 g/m².

In the case of test paper A, the Cobb value (1 minute) was 16, and the ink flotation test (50% strike-through) gave a value of 28 minutes, whilst in the case of test paper B the Cobb value was found to be 18 and the ink flotation test gave a value of 18.5 minutes.

15 parts of pentaerythritol are added to 100 parts of the copolymer described above and a 20% strength solution of the mixture in dimethylformamide is applied to a metal sheet as a 100 μ thick surface-coating film. The film is heated for half an hour at 120° C, and under these conditions crosslinking occurs. The surface-coating is insoluble in dimethylformamide or isopropanol.

EXAMPLE 2

A mixture of 55 parts of styrene, 30 parts of maleic anhydride and 15 parts of methyl acrylate is fed continuously to a polymerization zone which comprises a 1 liter pressure kettle followed by a pressure tube (1.5 l capacity) equipped with a static mixer. The polymerization is carried out at 200° C. The mean residence time of the monomers in the polymerization zone is 20 minutes and the pressure is 20 bars. The residual monomers (about 1%) are removed under a pressure of from 10 to 15 mm Hg, at from 120° to 180° C. N-dimethylhydrazine is then bubbled through the melt, and sufficient water is added to give an aqueous solution, of 30% solids content, of the salt of the copolymer. The copolymer has a molecular weight of 2,950.

The solution is diluted with water to a solids content of 0.6% and is used, after the conventional addition of 6% of an oxidatively degraded potato starch, which serves to strengthen the paper, as a sizing agent for paper, hereinafter referred to as sizing agent 2.

| Sizing agent 2: | Test paper A (cf. Example 1) | |
|---|---|---|
| | ° Cobb (1 minute) | 50% ink strike-through (minutes) |
| | 17 | 29 |

EXAMPLES 3 TO 10

The copolymers listed in the Table which follows were manufactured by the process described in Example 2.

| No. | Composition in parts by weight | Molecular weight |
|---|---|---|
| 3 | Styrene/acrylic acid/maleic anhydride<br>40   30   30 | 2,300 |
| 4 | Ethyl acrylate/acrylic acid/α-methyleneglutaric anhydride/maleic anhydride<br>50   15   25   10 | 1,800 |
| 5 | n-Butyl acrylate/vinyl-lactic acid/maleic anhydride<br>47   3   50 | 1,150 |
| 6 | Styrene/dodecyl acrylate/maleic anhydride<br>30   40   30 | 1,690 |
| 7 | Styrene/ethyl hexyl acrylate/acrylic acid/maleic anhydride<br>20   30   10   40 | 1,450 |
| 8 | Isobutene/acrylamide/ethyl acrylate/maleic anhydride<br>20   20   30   30 | 2,350 |
| 9 | Cyclopentadiene/acrylonitrile/maleic anhydride<br>30   20   50 | 3,110 |
| 10 | Vinylcarbazole/styrene/maleic anhydride<br>30   20   50 | 1,250 |

Use of the copolymers:
The copolymers manufactured in Examples 3 to 10 are reacted with hydrazine derivatives in 50% strength solution in dimethylformamide.

| Copolymer according to Example | Hydrazine derivative (structure, and amount in parts by weight) | Temperature ° C | Time hours | Use |
|---|---|---|---|---|
| 3 | $H_2N-NH-CONH_2$ (25) | 30 | 10 | crosslinkable surface coatings, which become insoluble, on baking, within 30' at from 120° C upward |

-continued

Use of the copolymers:
The copolymers manufactured in Examples 3 to 10 are reacted with hydrazine derivatives in 50% strength solution in dimethylformamide.

| Copolymer according to Example | Hydrazine derivative (structure, and amount in parts by weight) | Temperature °C | Time hours | Use |
|---|---|---|---|---|
| 4 | H₂N—NH—CH₃ (16) | 50 | 6 | antistatic coating agent for polyolefins |
| 5 | H₂N—NHC₂H₅ (30) | 100 in an autoclave | 3 | surface coatings for use in electrocoating |
| 6 | H₂N—NH—⟨phenyl⟩ (36) | 50 | 5 | co-binder for pigmented paper |
| 7 | H₂N—NH—⟨phenyl⟩—CH₃ (55) | 50 | 5 | co-binder for pigmented paper |
| 10 | H₂N—NH—⟨phenyl-NO₂⟩ (51) | 50 | 10 | electrically conducting films |
| 9 | H₂N—NH—SO₂—⟨phenyl⟩ (86) | 30 | 10 | crosslinkable surface coatings |
| 5 | H₂N—NH—CO—NH—⟨phenyl⟩ (68) | 25 | 10 | finishing of wood surfaces |
| 9 | H₂N—NH—CO—N(CH₃)(CH₂) (52) | 25 | 10 | crosslinkable surface coatings |
| 10 | H₂N—NH—⟨phenyl-NO₂, NO₂⟩ (74) | 25 | 10 | electrically conducting films |

We claim:
1. Copolymers which have a molecular weight, as determined by vapor pressure osmometry in chloroform at a concentration of 0.1% by weight and at 37° C., of from 600 to 24,500 and which contain from 0.1 to 60% by weight of units of the formula

$$\begin{array}{c} -CH-CH- \\ | \quad | \\ CO \quad CO \\ | \quad | \\ OH \quad NH \\ \quad | \\ \quad N \\ R^1 \diagup \diagdown R^2 \end{array}$$

where R¹ is H and R² is —CH₃, —C₂H₅, —C₃H₇,

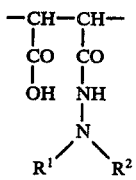

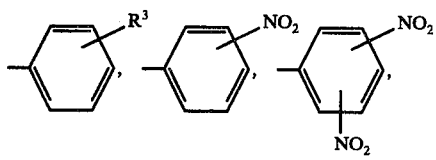

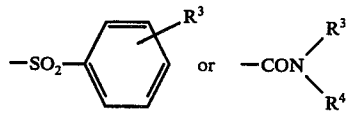

and R³ and R⁴ are —H, —CH₃, —C₂H₅ or —C₃H₇, and from 99.9 to 40 percent by weight of units of one or more ethylenically unsaturated monomers which are copolymerizable with maleic anhydride and are selected from amongst o(-olefins of 2 to 12 carbon atoms, monovinyl-aromatic compounds, alkyl esters of ethylenically unsaturated carboxylic acids of 3 to 5 carbon atoms, alkyl esters and alkyl half-esters of maleic acid or fumaric acid, ethylenically unsaturated carboxylic acids of 3 to 5 carbon atoms and their amides, o(-methyleneglutaric acid, vinylphosphonic acid, acrylamidopropanesulfonic acid and alkyl vinyl ethers.

2. A copolymer as claimed in claim 1 wherein the first-mentioned units of said copolymer are derived by reacting a copolymer of maleic anhydride with a compound of the formula

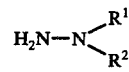

where -R² is —CH₃, —C₂H₅, —C₃H₇,

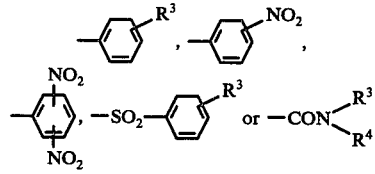

and R³ and R⁴ are independently H, CH₃, C₂H₅ or C₃H₇.

3. A copolymer as claimed in claim 1 wherein the first-mentioned units of said copolymer are derived by reacting a copolymer of maleic anhydride with a compound of the formula

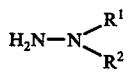

where -R² is —CH₃, —C₂H₅, —C₃H₇,

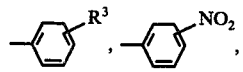

-continued

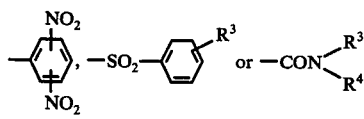 or $-CON\begin{smallmatrix}R^3\\R^4\end{smallmatrix}$ and $R^3$ and $R^4$ are independently H, $CH_3$, $C_2H_5$ or $C_3H_7$, and wherein said copolymer of maleic anhydride and said one or more ethylenically unsaturated monomers is derived by continuous polymerization at 130° to 320° C.

4. A copolymer as claimed in claim 1 wherein the first-mentioned units of said copolymer are derived by reacting a copolymer of maleic anhydride with a compound of the formula

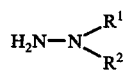

where $-R^2$ is $-CH_3$, $-C_2H_5$, $-C_3H_7$,

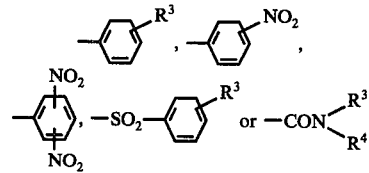, $-SO_2-$⟨⟩$-R^3$ or $-CON\begin{smallmatrix}R^3\\R^4\end{smallmatrix}$ and $R^3$ and $R^4$ are independently H, $CH_3$, $C_2H_5$ or $C_3H_7$, and wherein said copolymer of maleic anhydride and said one or more ethylenically unsaturated monomers is derived by continuous polymerization at 130° to 320° C in the absence of a polymerization initiator and a polymerization regulator.

5. A copolymer as claimed in claim 1 wherein $R^2$ is methyl.

6. A copolymer as claimed in claim 1 wherein $R^2$ is methyl, ethyl, phenyl, p-tolyl, o-nitrophenyl or o,p-dinitrophenyl.

7. A copolymer as claimed in claim 1 wherein $R^2$ is $-CONH_2$, CONHphenyl, or $-CON(CH_3)_2$.

8. A copolymer as claimed in claim 1 wherein $R^2$ is $-SO_2$-phenyl.

* * * * *

UNITED STATES PATENT AND TRADEMARK OFFICE
CERTIFICATE OF CORRECTION

PATENT NO. : 4,083,835
DATED : April 11, 1978
INVENTOR(S) : Heinz Pohlemann et al It is certified that error appears in the above—identified patent and that said Letters Patent are hereby corrected as shown below:

In the title, "HYDROZINE" should read -- HYDRAZINE --;

Column 7, lines 63 and 68, "o(" should read

-- α -- .

Signed and Sealed this

Nineteenth Day of December 1978

[SEAL]

Attest:

RUTH C. MASON
Attesting Officer

DONALD W. BANNER
Commissioner of Patents and Trademarks